United States Patent
Holowczak et al.

(10) Patent No.: US 6,696,144 B2
(45) Date of Patent: Feb. 24, 2004

(54) HYBRID MONOLITHIC CERAMIC AND CERAMIC MATRIX COMPOSITE AIRFOIL AND METHOD FOR MAKING THE SAME

(75) Inventors: John E. Holowczak, South Windsor, CT (US); Karl M. Prewo, Vernon, CT (US); Jayant S. Sabnis, Glastonbury, CT (US); William K. Tredway, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 56 days.

(21) Appl. No.: 10/131,403

(22) Filed: Apr. 24, 2002

(65) Prior Publication Data

US 2002/0155269 A1 Oct. 24, 2002

Related U.S. Application Data

(62) Division of application No. 09/444,277, filed on Nov. 19, 1999, now Pat. No. 6,451,416.

(51) Int. Cl.[7] ................................................ B32B 17/12
(52) U.S. Cl. ................. 428/293.4; 428/325; 428/312.2; 428/331; 428/688; 501/95.1; 501/92; 501/88
(58) Field of Search ..................... 428/325, 241, 428/242, 246, 312.2, 283, 294, 324, 330, 331, 688, 293.4; 501/88, 92, 95.1, 102

(56) References Cited

U.S. PATENT DOCUMENTS

| | | | |
|---|---|---|---|
| 4,580,524 A | | 4/1986 | Lackey, Jr. et al. |
| 5,211,999 A | | 5/1993 | Okada |
| 5,304,031 A | | 4/1994 | Bose |
| 5,306,554 A | * | 4/1994 | Harrison et al. ............. 428/283 |
| 5,306,565 A | | 4/1994 | Corbin et al. |
| 5,391,428 A | | 2/1995 | Zender |
| 5,488,017 A | * | 1/1996 | Szweda et al. ................ 501/95 |
| 5,552,215 A | | 9/1996 | Tredway et al. |
| 5,553,455 A | | 9/1996 | Craig et al. |
| 5,601,674 A | * | 2/1997 | Szweda et al. ................ 156/89 |
| 5,639,531 A | | 6/1997 | Chen et al. |
| 6,514,046 B1 | * | 2/2003 | Morrison et al. ........ 416/229 A |

OTHER PUBLICATIONS

Cutler, Willard A., et al., "Mechanical Behavior of Several Hybrid Ceramic–Matrix–Composite Laminates" J. Am. Ceram. Soc. 79 [7] 1825–33 (1996).

Cutler, Willard A., et al., "Delamination Resistance of Two Hybrid Ceramic–Composite Laminates." J. Am. Ceram. Soc. 80 [12] 3029–37 (1997).

Watanabe, Makato et al., "The Current Status of the CGT R&D Program in Japan." Proceedings of the Annual Automotive Technology Development Contractors Coordination Meeting P–265 (Nov. 2–5 1992).

* cited by examiner

*Primary Examiner*—Merrick Dixon
(74) *Attorney, Agent, or Firm*—McCormick, Paulding & Huber LLP

(57) ABSTRACT

The present invention is a low density hybrid airfoil comprising a temperature resistant exterior layer and a tough, high impact resistant interior layer. Specifically, the airfoil comprises a monolithic ceramic exterior layer and a fiber reinforced ceramic matrix composite interior layer. Both the monolithic ceramic and fiber reinforced ceramic matrix composite are low density materials. Additionally, the monolithic ceramic is a high temperature resistant material, and the fiber reinforced ceramic matrix composite is a relatively high impact resistant structure. Encapsulating the airfoil with a temperature resistant exterior layer protects the airfoil in a high temperature environment, and supporting the airfoil with a high impact resistant, fiber reinforced ceramic matrix composite improves the overall impact resistance of the airfoil thereby resulting in a tough, high temperature resistant, low density airfoil.

13 Claims, 1 Drawing Sheet

HYBRID MONOLITHIC CERAMIC AND CERAMIC MATRIX COMPOSITE AIRFOIL AND METHOD FOR MAKING THE SAME

"This application is a Divisional Application of U.S. Ser. No. 09/444,277 now U.S. Pat. No. 6,451,416 entitled 'Hybrid Monolithic Ceramic and Ceramic Matrix Composite Airfoil and Method for Making the Same', J. E. Holowczak, et al., filed on Nov. 19, 1999, and claims the benefit of the filing date thereof under 35 U.S.C. §120."

TECHNICAL FIELD

This invention relates to airfoils and more particularly to hybrid monolithic ceramic and ceramic matrix composite airfoils with increased impact resistance.

BACKGROUND ART

A turbomachine, such as an industrial gas turbine for a co-generation system or a gas turbine engine for an aircraft, includes a compressor section, a combustion section, and a turbine section. As the working medium gases travel along the flow path, the gases are compressed in the compressor section, thereby causing the temperature and pressure of the gases to rise. The hot, pressurized gases are burned with fuel in the combustion section to add energy to the gases, which expand through the turbine section and produce useful work and/or thrust.

The combustion section contains airfoils, such as vanes and blades, which direct the flow of gases as they pass therethrough, thereby ensuring the proper mixing between the fuel and gases. The airfoils are, therefore, exposed to gas temperatures ranging from about 870° C. (1600° F.) to 1870° C. (3400° F.). However, the operating temperature of the turbomachine is often limited by the airfoil's ability to withstand such temperatures for an extended period. Improving the airfoil's temperature capabilities would, therefore, increase the combustion section's operating temperature, which, in turn, would improve the turbomachines overall operating efficiency.

Airfoils must not only be capable of withstanding elevated temperatures, but they must also have relatively high impact resistance. For example, foreign objects occasionally enter the turbomachine during operation. Therefore, the airfoils must be capable of withstanding the impact force caused by the foreign object. Toughness is one means of determining a material's impact resistance. Hence, toughness becomes an important design consideration because as the toughness increases, so does the airfoil's ability to withstand and absorb the impact of foreign objects.

One method of improving the airfoil's temperature capability includes manufacturing the airfoil from superalloys, such as nickel based superalloys. Superalloys are not only capable of withstanding elevated temperatures but also have high toughness. Superalloys, however, typically have a relatively high density, thereby increasing the overall weight of the turbomachine. Weight reduction in aircraft design is a critical issue because a decrease in weight translates to improved fuel efficiency. Designers of turbomachines are therefore encouraged to seek alternative materials, which decrease the weight of the airfoils.

One such class of alternative materials is ceramic matrix composites, which typically has a lower density than superalloys. Although ceramic matrix composites are not typically as tough as superalloys, ceramic matrix composites are currently capable of withstanding a continuous temperature of about 1200° C. (2200° F.). Ceramic matrix composites, however, are more expensive than superalloys. Hence, the application of ceramic matrix composites, to date, has been limited by their inherently high fabrication cost. The shape and structure of an airfoil have also limited the use of ceramic matrix composites in fabricating such parts. In order to achieve high aerodynamic efficiency, the airfoil typically has a thin cross section and sharp radius trailing edge. Airfoils constructed of superalloys typically have a trailing edge thickness of less than about 0.04 inch. Such a thickness, however, presents difficulties when manufacturing airfoils from ceramic matrix composites because ceramic matrix composites are typically constructed from two approaches, namely a layered cloth approach and a woven approach. Specifically, airfoil cross sections of less than 0.05 inch typically do not provide a sufficient thickness for creating a balanced fiber architecture for a layered cloth approach. Moreover, woven approaches suffer from the difficulty in transitioning the fibers around the acute radius, which is typically required.

Additionally, ceramic matrix composites are susceptible to erosion, thereby further limiting their application to airfoils. Particulate matter typically becomes entrained within the working fluid of the turbine. Because most of the commonly available ceramic matrix composites have significantly lower erosion rates when compared to superalloys, ceramic matrix composite airfoils are more susceptible to erosion than airfoils constructed of superalloys. Therefore, the use of ceramic matrix composites within turbomachines is currently not an attractive alternative to the use of superalloys.

Another materials approach for increasing the airfoil's temperature capability includes manufacturing the airfoils from monolithic ceramics. Monolithic ceramics can withstand slightly greater temperatures than ceramic matrix composites. Specifically, monolithic ceramics constructed of silicon nitride ($Si_3N_4$) can withstand higher temperatures than ceramic matrix composites, such as SiC/SiC, over an equivalent time span. Monolithic ceramics also utilize raw materials which are lower in cost than ceramic matrix composites, thereby allowing monolithic ceramics to approach the cost equivalency with superalloys. Additionally, monolithic ceramics typically passes higher erosion resistance than ceramic matrix composites and superalloys. Furthermore, monolithic ceramics are not constrained from being formed into certain shapes, such as ceramic matrix composites. However, the fracture toughness values for monolithic ceramics are typically significantly less than that for both superalloys and ceramic matrix composites. Therefore, when designing airfoils and considering characteristics, such as impact resistance and fabrication cost, both ceramic matrix composites and monolithic ceramics are independently inadequate replacements for superalloys.

What is needed is a tough, cost efficient, high temperature resistant low density airfoil.

Disclosure of Invention

The present invention is a hybrid airfoil comprising a temperature resistant exterior layer and a tough, high impact resistant interior layer. Encapsulating the hybrid airfoil with a temperature resistant exterior layer protects the airfoil when exposed to a high temperature environment, and supporting the hybrid airfoil with a high impact resistant interior layer, thereby improves the overall impact resistance of the airfoil. Additionally, the hybrid airfoil has a lower density and is more erosion resistant than a similar airfoil constructed of a superalloy.

In one embodiment of the present invention, the airfoil has an exterior layer, which is a monolithic ceramic, and an interior layer, which is a fiber reinforced ceramic matrix composite. The monolithic ceramic provides the airfoil with temperature resistance. The fiber reinforced ceramic matrix composite's impact resistance is greater than the monolithic ceramic's impact resistance, thereby increasing the airfoil's impact resistance in comparison to that of an airfoil comprised of only a monolithic ceramic. Combining the two materials into a hybrid airfoil exploits the benefits of each material. Specifically, the monolithic ceramic exterior improves the hybrid airfoil's temperature resistance, and the fiber reinforced ceramic matrix composite interior layer improves the hybrid airfoil's toughness and overall impact resistance. Additionally, the raw material cost of the hybrid airfoil is less expensive than the raw material cost of the same airfoil constructed of only a ceramic matrix composite. Namely combining these two layers reduces the required amount of ceramic matrix composite raw material, which is typically more expensive than monolithic ceramic. Most importantly, the density of the hybrid airfoil is less than that of an identically shaped airfoil constructed of a superalloy. Hence, the hybrid monolithic ceramic and ceramic matrix composite airfoil is a tough, cost efficient, high temperature resistant airfoil.

The monolithic ceramic may be comprised of silicon nitride ($Si_3N_4$), silicon aluminum oxynitride (SiAlON), silicon carbide (SiC), silicon oxynitride ($Si_2N_2O$), aluminum nitride (AlN), aluminum oxide ($Al_2O_3$), hafnium oxide ($HfO_2$), zirconia ($ZrO_2$), siliconized silicon carbide (Si—SiC) or other oxides, carbides or nitrides or a combination thereof. Constructing the exterior layer with a monolithic ceramic allows the airfoil to maintain its high temperature resistant characteristics. The hybrid monolithic ceramic and ceramic matrix composite airfoil can withstand both elevated temperatures within a gas turbine as well as impact from foreign objects because supporting the monolithic ceramic with a fiber reinforced ceramic matrix composite improves the airfoil's impact resistance.

In another embodiment of the present invention the method for affixing the fiber reinforced ceramic matrix composite to the interior of the monolithic ceramic layer includes either laminating the reinforced ceramic matrix composite to the monolithic ceramic layer, creating a chemical vapor infiltrated layer on the interior surface of the monolithic ceramic layer or forming a pre-ceramic polymer pyrolysis ceramic matrix composite on the interior surface of the monolithic ceramic layer. Regardless of which method is used to affix the fiber reinforced ceramic matrix composite to the interior of the monolithic ceramic, the reinforcement fibers within the fiber reinforced ceramic matrix composite may include fibers such as silicon carbide (SiC), aluminum oxide ($Al_2O_3$), silicon nitride ($Si_3N_4$), carbon (C), or combinations thereof. The type of material used to construct the matrix within the fiber reinforced ceramic matrix composite, however, may depend upon the method used to affix the fiber reinforced ceramic matrix composite to the interior of the monolithic ceramic.

For example, if the fiber reinforced ceramic matrix composite is laminated to the monolithic ceramic, then the matrix may include a magnesium aluminum silicate, magnesium barium aluminum silicate, lithium aluminum silicate, barium strontium aluminum silicate, or barium aluminum silicate matrix or combinations thereof. Such silicate matrices are often referred to as glass ceramic matrices or composites. If the fiber reinforced ceramic matrix composite is created by a chemical vapor infiltrated layer on the interior surface of the monolithic ceramic layer, then the matrix may include a silicon carbide (SiC), silicon nitride ($Si_3N_4$), aluminum oxide ($Al_2O_3$), silicon aluminum oxynitride (SiAlON), aluminum nitride (AlN), zirconium oxide ($ZrO_2$), zirconium nitride (ZrN), or hafnium oxide ($HfO_2$) matrix. If the fiber reinforced ceramic matrix composite is formed by a polymer pyrolysis ceramic matrix composite on the interior surface of the monolithic ceramic layer, then the matrix may include a silicon nitrogen carbon oxygen compound, boron nitride (BN), silicon carbide (SiC) or silicon nitride ($Si_3N_4$), or mixtures thereof.

The foregoing features and advantages of the present invention will become more apparent in light of the following detailed description of exemplary embodiments thereof as illustrated in the accompanying drawings.

BEST MODE FOR CARRYING OUT THE INVENTION

Figure 1:
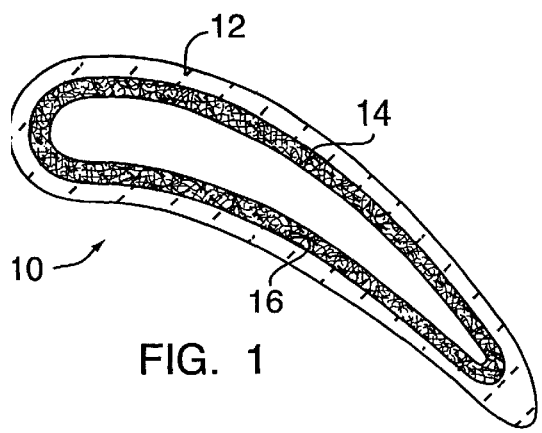
FIG. 1 is a cross sectional view of an airfoil of the present invention taken along the chord of the airfoil.

Referring to FIG. 1, there is shown a hybrid airfoil 10 comprising an exterior monolithic ceramic layer 12 and an interior fiber reinforced ceramic matrix composite layer 14. The fiber reinforced ceramic matrix composite layer 14 is affixed to the interior surface 16 of the monolithic ceramic layer 12. The monolithic ceramic layer 12 shall hereinafter be referred to as "the monolithic layer 12", and the interior fiber reinforced ceramic matrix composite layer 14 shall hereinafter be referred to as "the CMC layer 14." Because the hybrid airfoil 10 is utilized as either a vane or a blade within a gas turbine, the hybrid airfoil 10 is exposed to gas having temperatures ranging from about 870° C. (1600° F.) to 1870° C. (2300° F.). By way of known methods, therefore, the monolithic layer 12 is constructed of materials that are capable of withstanding such temperatures. Examples of monolithic ceramics that are capable of withstanding such elevated temperatures comprise silicon nitride ($Si_3N_4$), silicon aluminum oxynitride (SiAlON), silicon carbide (SiC), silicon oxynitride ($Si_2N_2O$), aluminum nitride (AlN), aluminum oxide ($Al_2O_3$) hafnium oxide ($HfO_2$), zirconia ($ZrO_2$), siliconized silicon carbide (Si—SiC) or a combination thereof. It shall be understood that other oxides, carbides or nitrides may also be capable of withstanding such elevated temperatures.

It is possible to affix the CMC layer 14 to the interior surface 16 of the monolithic ceramic layer 12 in a number of ways. However, due to the geometric shape of the hybrid airfoil 10, it is preferable to affix the CMC layer 14 to the interior surface 16 of the monolithic ceramic layer 12 by infiltrating a ceramic fiber mat or preform with either a matrix material or a matrix precursor. Specifically, such methods include, (1) infiltrating a glass into a ceramic fiber mat or preform, which contacts the monolithic ceramic layer 12, (2) creating the matrix of CMC layer 14 by a chemical vapor infiltrated process while the CMC layer is in contact with the interior surface of the monolithic ceramic layer 12 and (3) forming the matrix of a CMC layer 14 by a polymer infiltration and pyrolysis process while a fibrous mat or preform contacts the interior surface of the monolithic ceramic layer 12.

Assuming that the woven ceramic fiber preform layer 14 is placed adjacent to the monolithic ceramic layer 12, a ceramic matrix composite layer 14, such as a glass-ceramic matrix composite is manufactured using known methods. The glass-ceramic matrix composite comprises a matrix and a fiber reinforcement. The matrix for a glass-ceramic matrix composite typically comprises a silicate capable of being crystallized. Examples of such silicates comprise magnesium aluminum silicate, magnesium barium aluminum silicate, lithium aluminum silicate and barium aluminum silicate. The glass-ceramic matrix composite reinforcement typically comprises a ceramic fiber capable of high tensile strength and elevated temperature creep resistance. Examples of such ceramic fibers comprise silicon carbide (SiC), silicon nitride ($Si_3N_4$) aluminum oxide ($Al_2O_3$), silicon aluminum oxynitride (SiAlON), aluminum nitride (AlN) and combinations thereof.

For example, the inventors of the present invention manufactured a 0.40 cm (0.150 inch) thick by 10.20 cm (4.0 inches) by 10.20 cm (4.0 inches) hybrid part comprising a silicon aluminum oxynitride (SiAlON) monolithic ceramic layer 12 and a barium magnesium alumino silicate (BMAS) silicate/silicon carbide (SiC) fiber composite CMC layer 14. The silicon aluminum oxynitride (SiAlON) monolithic ceramic layer 12 was created by mixing 160 grams of a silicon nitride based powder, such as UBE E-10 and UBE E-03 distributed by UBE America of New York, N.Y., with 26 grams of yttria ($Y_2O_3$), 10 grams of lanthia ($La_2O_3$), and 4 grams of water resistant aluminum nitride (AlN). The entire mixture was ball milled overnight in deionized water, having a pH equal to about 10. The entire mixture was thereafter, decanted, dried and granulated by passing it through a 30-mesh stainless steel screen. The dried granulated mixture was charged into a graphite die coated with a boron nitride (BN) release agent, and the combined mixture was placed in a graphite hot press die. The hot press was operated in a nitrogen atmosphere and applied 27.6 MPa (4000 psi) of pressure at about 1750° C. (3180° F.) for about one (1) hour. After the silicon aluminum oxynitride (SiAlON) monolithic ceramic layer 12 was formed, it was removed from the hot press die and sand blasted with a 325 mesh aluminum oxide media for about thirty (30) minutes in order to remove the boron nitride release agent and to create a slight textured surface.

The BMAS/SiC fiber CMC layer 14 was prepared by cutting a 10.2 cm (4.0 inch) by 10.2 cm (4.0 inch) single ply of silicon carbide (SiC) fiber cloth having an 8 harness satin weave. An example of such a silicon carbide (SiC) fiber cloth includes Nicalon™ silicon carbide (SiC) fiber cloth manufactured by Nippon Carbon. The silicon carbide (SiC) fiber cloth was immersed in aqueous slurry of barium magnesium alumino silicate (BMAS) glass powder. After five (5) minutes, the Nicalon™ silicon carbide (SiC) fiber cloth was removed from the aqueous slurry and dried at a temperature of 200° C. (390° F.) for about thirty (30) minutes, thereby impregnating a barium aluminum silicate/silicon carbide (SiC) fiber reinforced CMC pre-preg layer.

The process for forming a layer of BMAS/SiC CMC layer was repeated three additional times such that a total of four BMAS/SiC CMC pre-preg layers were formed. All four layers were placed over the previously fabricated silicon aluminum oxynitride (SiAlON) monolithic ceramic layer 12 in the graphite hot press die. The hot press die applied 5.2 MPa (750 psi) of pressure at about 1420° C. (2590° F.) for about thirty (30) minutes in a nitrogen atmosphere, thereby forming a hybrid structure comprising a silicon aluminum oxynitride (SiAlON) monolithic layer and a BMAS/SiC CMC layer. Although the barium aluminum silicate (BMAS) silicon carbide (SiC) CMC layer comprised four individual layers, one skilled in the art would recognize that the hybrid structure could have originally been comprised of only one such layer had it formed a CMC layer with a desired thickness for the hybrid structure. After being hot pressed, the 0.38 cm (0.15 inch) thick hybrid structure included a 0.28 cm (0.11 inch) silicon nitride ($Si_3N_4$) monolithic ceramic layer 12 and a 0.10 cm (0.038 inch) barium aluminum silicate material silicon carbide (SiC) fiber reinforced CMC layer 14. Although this example utilized a hot pressing method to laminate the monolithic ceramic layer 12 to the CMC layer 14, alternate laminating methods, such as glass transfer molding or hot isostatic pressing (HIP), could have also been utilized to create a more complicated structure.

A second hybrid structure was created using the identical process described above except that the BMAS/SiC CMC layer 14 of the hybrid structure was subjected to a crystallization process after being fabricated but before being laminated to the monolithic layer. The additional crystallization step comprised the process of heating the barium aluminum silicate matrix (BMAS)/silicon carbide (SiC) CMC layer 14 at a temperature of 1200° C. (2200° F.) for about twenty-four (24) hours.

Another silicon nitride ($Si_3N_4$) monolithic layer 12, having a total thickness of about 0.36 cm (0.14 inch), was also produced and served as a control for the impact testing. The samples were thereafter machined into impact test specimens. The structural composition of the samples included (1) the hybrid structure comprising the silicon aluminum oxynitride (SiAlON) monolithic layer 12 and the non-crystallized barium magnesium alumino silicate (BMAS) matrix/silicate silicon carbide (SiC) glass ceramic CMC layer 14, (2) the hybrid structure comprising the silicon aluminum oxynitride (SiAlON) monolithic layer 12 and the crystallized barium magnesium alumino silicate (BMAS) matrix/silicate silicon carbide (SiC) glass ceramic CMC layer 14, and (3) the independent silicon aluminum oxynitride (SiAlON) monolithic layer 12, which served as a control specimen. Referring to Table 1, 0.64 cm (0.25 inch) by 0.36 cm (0.14 inch) strips were cut from the above three sample types and subjected to an un-notched Charpy impact test. More specifically, the Charpy impact test was performed according to ASTM D256, with the exception that the specimens were un-notched and had dimensions of 0.25 inches by 0.14 inches, rather than 0.40 inches by 0.40 inches.

TABLE 1

| Sample Type | Sample Orientation | Average Impact Absorption (ft · lbf) | Standard Deviation (ft · lbf) |
| --- | --- | --- | --- |
| SiAlON/BMAS—SiC hybrid with non-crystallized matrix | Impact on SiAlON monolithic surface | 1.95 | 0.60 |
| SiAlON/BMAS—SiC hybrid with crystallized matrix | Impact on SiAlON monolithic surface | 1.87 | 0.18 |
| SiAlON/BMAS—SiC hybrid with crystallized matrix | Impact on BMAS—SiC CMC surface | 1.07 | 0.09 |

TABLE 1-continued

| Sample Type | Sample Orientation | Average Impact Absorption (ft · lbf) | Standard Deviation (ft · lbf) |
|---|---|---|---|
| Monolithic SiAlON | Impact on SiAlON monolithic surface | 0.07 | 0.02 |

The first specimen group consisted of a silicon aluminum oxynitride (SiAlON) monolithic ceramic layer 12 and a non-crystallized barium magnesium alumino silicate (BMAS)/silicon carbide (SiC) fiber reinforced glass ceramic matrix composite (CMC) layer 14. This first group of specimens was oriented such that the silicon aluminum oxynitride (SiAlON) monolithic ceramic layer was the side impacted by the Charpy impact hammer, thereby placing the CMC layer in tension. The first group of specimens absorbed impact energy of about 1.95 ft·lbf, with a standard deviation of about 0.60 ft·lbf, during fracture.

The second specimen group consisted of a silicon aluminum oxynitride (SiAlON) monolithic ceramic layer 12 and a crystallized barium magnesium alumino silicate (BMAS) matrix/silicon carbide (SiC) fiber reinforced glass ceramic matrix composite (CMC) layer 14. This second group of specimens was oriented such that the silicon aluminum oxynitride (SiAlON) monolithic ceramic layer was the side impacted by the Charpy impact hammer, thereby placing the CMC layer in tension. The second group of specimens had an average impact energy absorption of about 1.87 ft·lbf, with a standard deviation of about 0.18 ft·lbf.

The third group of specimens consisted of the same construction as the second group of specimens, but the third group of specimens was oriented such that the CMC layer, rather than the silicon aluminum oxynitride (SiAlON) monolithic ceramic layer, was the side impacted by the Charpy impact hammer. The silicon nitride (SiAlON) monolithic ceramic layer was, therefore, placed in tension. The third group of specimens absorbed an average impact energy of about 1.07 ft·lbf, with a standard deviation of about 0.09 ft·lbf.

The fourth group of specimens consisted of a solid silicon aluminum oxynitride (SiAlON) monolithic ceramic. In other words, the fourth group of specimens did not contain a CMC layer. The fourth specimen absorbed an average impact energy of about 0.07 ft·lbf, with a standard deviation of about 0.02 ft·lbf, during fracture.

The results of the impact test indicate that a hybrid structure comprising a silicon nitride based monolithic ceramic layer 12 and a barium magnesium alumino silicate (BMAS)/silicon carbide (SiC) fiber CMC layer 14 is capable of absorbing greater levels of impact energy than a single silicon nitride based monolithic layer 12 because the individual silicon aluminum oxynitride (SiAlON) monolithic ceramic layer demonstrated a lower impact energy absorption value compared to any of the hybrid structures. Specifically, the individual silicon aluminum oxynitride (SiAlON) monolithic ceramic layer had an average impact energy absorption of about 0.07 ft·lbf, and the hybrid structure, which was oriented such that Charpy hammer impacted the monolithic ceramic layer, had average impact energy absorption of about 1.95 ft·lbf. Therefore, the hybrid structure, comprising a monolithic ceramic supported by a CMC layer, absorbed about twenty-seven (27) times more impact energy than the plain monolithic ceramic specimen. Hence a hybrid airfoil is significantly tougher than a monolithic ceramic airfoil.

A hybrid structure comprising a silicon aluminum oxynitride (SiAlON) monolithic layer 12 and a barium magnesium alumino silicate (BMAS) matrix/silicon carbide (SiC) fiber reinforced CMC layer 14 is capable of withstanding greater impact energy if the silicon nitride ($Si_3N_4$) monolithic layer 12 experiences the direct impact rather than the BMAS/SiC fiber reinforced CMC layer 14. In comparing the second and third specimen groups, which were both hybrid structures, the second specimen group absorbed an average impact energy of about 1.87 ft·lbf and the third specimen group absorbed an average impact energy of about 1.07 ft·lbf because the third specimen group was oriented such that the Charpy hammer contacted the CMC layer side of the hybrid structure, and the second specimen group was oriented such that the Charpy hammer contacted the monolith ceramic side of the hybrid structure. In fact, the hybrid structure absorbed about seventy five percent (75%) greater impact energy when the hybrid structure was oriented such that the Charpy hammer contacted the monolith ceramic portion of the hybrid structure. Therefore, a hybrid airfoil 10 comprising an exterior monolithic layer 12 and an interior CMC layer 14 is capable of withstanding greater foreign object impact compared to a monolithic ceramic airfoil or a hybrid airfoil comprising an exterior fiber reinforced ceramic matrix composite (CMC) layer and an interior monolithic ceramic layer.

The results of the impact test also indicate that a hybrid structure comprising an interior silicon nitride ($Si_3N_4$) based monolithic layer 12 and an exterior barium magnesium alumino silicate (BMAS) matrix silicon carbide (SiC) fiber reinforced CMC layer 14 may have greater impact resistance if the CMC layer comprises a non-crystallized matrix rather then a crystallized matrix. Specifically, the first specimen group, which is comprised of a non-crystallized matrix, had an average impact energy absorption of about 1.95 ft·lbf. The second specimen group, which comprised a crystallized matrix had an average impact resistance of about 1.87 ft·lbf. The second group of specimens, therefore, absorbed about four percent (4%) less impact energy than the hybrid structure comprising the non-crystallized matrix. However, the standard deviation of the first specimen's impact energy absorption was 0.60 ft·lbf, and the standard deviation for the second specimen's impact energy was 0.18 ft·lbf. Therefore, the average impact absorption for the first and second specimens closely resemble each other due to the overlap caused by the standard deviation. It is, nevertheless, possible that the impact energy absorption of the hybrid structure comprising the non-crystallized matrix could be less than the impact resistance of the hybrid structure comprising the crystallized matrix.

Figure 2:
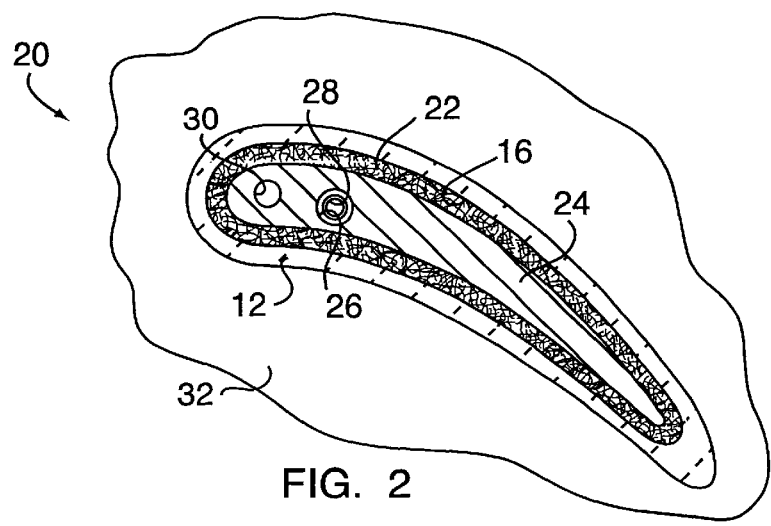
FIG. 2 depicts an apparatus used to manufacture the airfoil illustrated in FIG. 1.
Figure 3:
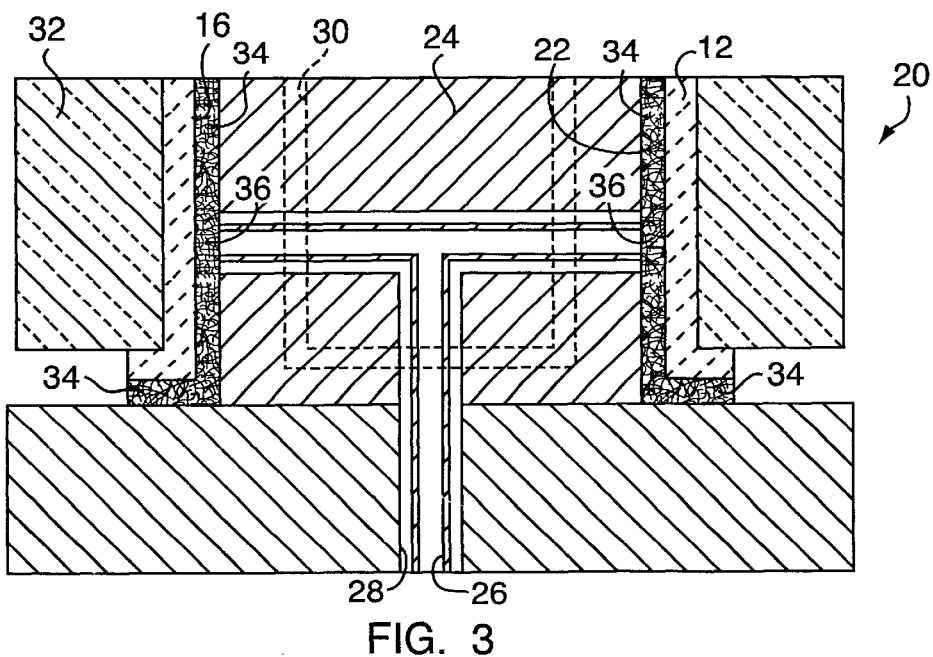
FIG. 3 is a sectional view of the apparatus depicted in FIG. 2 taken along the chord of the hybrid airfoil.

Referring to FIGS. 2 and 3, an alternate method of affixing the CMC layer 14 to the monolithic layer 12 comprises creating a CMC layer 14 through a chemical vapor infiltration process while a fibrous preform 22 (i.e., fiber cloth or woven preform) contacts the interior surface 16 of the monolithic layer 12. FIG. 2 is an end view of the hybrid airfoil 10 and FIG. 3 is a sectional view of the hybrid airfoil 10 taken along its chord. An apparatus 20 for producing a hybrid airfoil via such means includes an airfoil shaped monolithic layer 12, a fibrous pre-form 22, a mandrel 24 and an insulating block 32. The entire apparatus 20 is placed into an oven, which provides a means for heating the apparatus 20.

The airfoil shaped monolithic layer 12 is placed within an insulating block 32 that has a cavity shaped to receive the monolithic layer 12. After coating or treating the fibrous pre-form 22 with chemical vapor infiltration (CVI) boron nitride (BN) or other known interfacial coatings that allow for fiber/matrix debonding, the fibrous pre-form 22 is placed adjacent to the interior surface 16 of the monolithic ceramic layer 12. The fibrous pre-form 22 serves as the fiber reinforcement of the CMC layer 14 (FIG. 1). The fibrous pre-form 22 may be comprised of silicon carbide (SiC), silicon aluminum oxy nitrogen (SiAlON), aluminum oxide ($Al_2O_3$), carbon (C) or other inorganic fibers capable of high specific strength or combinations thereof.

A mandrel 24, typically made of graphite, is slipped into the interior of the monolithic ceramic layer 12, with the fibrous pre-form 22 in place, thereby compressing the fibrous pre-form 22 against the interior surface 16 of the monolithic ceramic layer 12. The mandrel 24 includes a first reactant gas stream port 26 and a second reactant gas stream port 28. The first and second reactant gas stream ports 26, 28 allow known reactant gases to communicate with the fibrous pre-form 22 via passageways within the mandrel 24. Although two reactant gas steam ports are illustrated, it is possible to use one gas stream port if the reactant gases can be properly mixed before entering the mandrel 24. The reactant gases communicate firstly with the interior surface 36 of the fibrous pre-form 22 and permeate therethrough to its exterior surface 34. As the reactant gases communicate with the fibrous pre-form 22, the chemical vapor deposition reaction occurs, and the matrix layer is formed. Any unused reactant gases escape via the ends of the fibrous pre-form 22. Additionally the exhaust from the chemical vapor deposition process escapes from the apparatus 20 via the ends of fibrous pre-form 22.

It is preferable for the temperature of the reactant gases to be cooler than the temperature of the insulating block 32 in order to produce a thermal gradient across the fibrous pre-form 22, such that the temperature of the fibrous pre-form 22 increases from its interior 36 to its exterior 34. Heating the apparatus 20 by convectional means, such as placing it in an oven, while filling the interior with cooler reactant gases, inherently creates a thermal gradient. An additional means off creating a thermal gradient includes cooling the mandrel 24. One such means for cooling the mandrel 24 comprises introducing cooling water to the cooling channel port 30 and circulating cooling water through the mandrel 24. The cooling channel can enter the mandrel 24 through one side and exit through the other side as illustrated in FIG. 2, or the cooling channel can be a serpentine channel and enter and exit the same side of the mandrel as seen in FIG. 3. The cooling channel assists in producing a thermal gradient across the fibrous pre-form 22, thereby allowing the chemical vapor reaction to first occur at its exterior surface 34. Specifically, the chemical vapor deposition reaction occurs as the reactant gases pass through the fibrous form and become adequately heated. Moreover, as the temperature of the reactant gases increases, the more rapid the chemical vapor deposition reaction occurs. Because the temperature of the fibrous pre-form 22 is greater at its exterior surface 34, the chemical vapor deposition process first occurs closest to the monolithic ceramic layer 12 and progresses inward toward the mandrel 24. Initiating the chemical vapor deposition reaction at the fibrous pre-form's exterior surface 34 not only enhances the formation of a larger cross sectional area of the CMC layer, but also creates a strong bond between the CMC layer and the monolithic ceramic layer 12.

If the CMC layer 14 is affixed to the monolithic ceramic layer 12 by forming a polymer pyrolysis ceramic matrix composite on the interior surface of the monolithic ceramic layer, then the matrix may include an amorphous silicon nitrogen carbon oxygen compound (Si—N—C—O), boron nitride (BN), silicon carbide (SiC) or silicon nitride ($Si_3N_4$) or combinations thereof. The matrix is reinforced with a ceramic fiber such as silicon carbide (SiC), aluminum oxide ($Al_2O_3$), carbon (C) or combinations thereof.

Although the invention has been described and illustrated with respect to the exemplary embodiments. thereof, it should be understood by those skilled in the art that the foregoing and various other changes, omissions and additions may be made without departing from the spirit and scope of the invention.

What is claimed is:

1. An airfoil, comprising:
   (a) a first layer comprising a monolithic ceramic; and
   (b) a second layer comprising a fiber reinforced ceramic matrix composite, said second layer being interior to said first layer.

2. The airfoil of claim 1 wherein said monolithic ceramic contacts said fiber reinforced ceramic matrix composite.

3. The airfoil of claim 2 wherein said monolithic ceramic is affixed to said fiber reinforced ceramic matrix composite.

4. The airfoil of claim 1 wherein said monolithic ceramic is selected from the group consisting essentially of silicon nitride ($Si_3N_4$), silicon aluminum oxynitride (SiAlON), silicon oxynitride ($Si_2N_2O$), silicon carbide (SiC), aluminum nitride (AlN), aluminum oxide ($Al_2O_3$), hafnium oxide ($HfO_2$), zirconia ($ZrO_2$) siliconized silicon carbide (SiSiC) and combinations thereof.

5. The airfoil of claim 1 wherein said fiber reinforced ceramic matrix composite is a glass-ceramic matrix composite.

6. The airfoil of claim 5 wherein said fiber reinforced glass-ceramic matrix composite comprises a matrix selected from the group consisting essentially of magnesium aluminum silicate, magnesium barium aluminum silicate, lithium aluminum silicate, barium strontium aluminum silicate, barium aluminum silicate and combinations thereof.

7. The airfoil of claim 6 wherein said glass-ceramic matrix composite comprises fibers selected from the group consisting essentially of silicon carbide (SiC), aluminum oxide ($Al_2O_3$), silicon nitride ($Si_3N_4$), carbon (C) and combinations thereof.

8. The airfoil of claim 1 wherein said fiber reinforced ceramic matrix composite is formed by a chemical vapor infiltration process.

9. The airfoil of claim 8 wherein said fiber reinforced ceramic matrix composite comprises a matrix selected from the group consisting essentially of silicon carbide (SiC), silicon nitride. ($Si_3N_4$), aluminum oxide ($Al_2O_3$), silicon aluminum oxynitride (SiAlON), aluminum nitride (AlN), zirconium oxide ($ZrO_2$), zirconium nitride (ZrN), hafnium oxide ($HfO_2$) and combinations thereof.

10. The airfoil of claim 8 wherein said fiber reinforced ceramic matrix composite comprises fibers selected from the group consisting essentially of silicon carbide (SiC), aluminum oxide ($Al_2O_3$) silicon nitride ($Si_3N_4$), Carbon (C) and combinations thereof.

11. The airfoil of claim 1 wherein said fiber reinforced ceramic matrix composite is formed by a pre ceramic polymer infiltration pyrolysis process.

12. The airfoil of claim 11 wherein said fiber reinforced ceramic matrix composite comprises a matrix selected from the group consisting essentially of silicon nitride carbon oxygen compound (Si—N—C—O), boron nitride (BN), silicon carbide (SiC) and silicon nitride ($Si_3N_4$).

13. The airfoil of claim 11 wherein said fiber reinforced ceramic matrix composite comprises fibers selected from the group consisting essentially of silicon carbide (SiC), aluminum oxide ($Al_2O_3$) and combinations thereof.

* * * * *